United States Patent
Tseng

(10) Patent No.: US 11,177,753 B2
(45) Date of Patent: Nov. 16, 2021

(54) ELECTRIC MACHINE CONTROL SYSTEM AND CONTROL METHOD THEREOF

(71) Applicant: Delta Electronics, Inc., Taoyuan (TW)

(72) Inventor: Shao-Kai Tseng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/923,617

(22) Filed: Jul. 8, 2020

(65) Prior Publication Data

US 2021/0075357 A1  Mar. 11, 2021

(30) Foreign Application Priority Data

Sep. 5, 2019 (CN) .......................... 201910838001.6

(51) Int. Cl.
*H02P 23/14* (2006.01)
*H02P 27/08* (2006.01)

(52) U.S. Cl.
CPC .............. *H02P 23/14* (2013.01); *H02P 27/08* (2013.01)

(58) Field of Classification Search
CPC ...... H02P 1/00; H02P 1/04; H02P 1/16; H02P 1/163; H02P 1/18; H02P 1/24; H02P 1/26; H02P 1/265; H02P 1/28; H02P 1/42; H02P 1/46; H02P 1/465; H02P 1/54; H02P 3/00; H02P 3/08; H02P 3/24; H02P 4/00; H02P 5/00; H02P 6/00; H02P 6/005; H02P 6/04; H02P 6/06; H02P 6/08; H02P 7/00; H02P 7/29; H02P 7/265; H02P 21/00; H02P 21/22; H02P 21/0003; H02P 21/14; H02P 21/18; H02P 21/0021; H02P 21/04; H02P 23/00; H02P 27/04; H02P 27/06; H02P 25/062
See application file for complete search history.

(56) References Cited

U.S. PATENT DOCUMENTS 5,598,081 A * 1/1997 Okamura ................. H02P 21/24
318/52

FOREIGN PATENT DOCUMENTS

CN          106452258 A     2/2017

* cited by examiner

*Primary Examiner* — Antony M Paul
(74) *Attorney, Agent, or Firm* — Muncy, Geissler, Olds & Lowe, P.C.

(57) ABSTRACT

An electric machine control system adapted to a motor includes a voltage detector, a power module, a current detector and a controller. The voltage detector detects a bus voltage to generate a voltage detection signal. The power module generates a first phase current, a second phase current and a third phase current to drive the motor according to the bus voltage and a PWM signal. To generate the current detection signal, the current detector detects at least two of the following: the first phase current, the second phase current and the third phase current. When the motor is operating in a steady state and blocked, the controller calculates the DC offset error of the motor according to the voltage detection signal and the current detection signal.

14 Claims, 4 Drawing Sheets

ELECTRIC MACHINE CONTROL SYSTEM AND CONTROL METHOD THEREOF

CROSS REFERENCE TO RELATED APPLICATIONS

This Application claims priority of China Patent Application No. 201910838001.6, filed on Sep. 5, 2019, the entirety of which is incorporated by reference herein.

BACKGROUND OF THE INVENTION

Field of the Invention

The disclosure relates generally to electric machine control systems and control methods thereof, and more particularly it relates to electric machine control systems and control methods thereof for calculating the DC offset error.

Description of the Related Art

In controlling an electric machine, it is expected that the accuracy of torque be kept within a strict range, such as ±5%. However, the torque may not be measured directly, and must be estimated by measuring three-phase currents and estimating the parameters of the electric machine. Therefore, an accurate current measurement and accurate estimates of the parameters of the electric machine would be of benefit in meeting the torque requirements.

In addition, since there is a DC offset error between the measured current and the real current, it is necessary to estimate the DC offset error to predict the real current.

BRIEF SUMMARY OF THE INVENTION

In an embodiment, an electric machine control system adapted to a motor is provided. The electric machine control system comprises a voltage detector, a power module, a current detector and a controller. The voltage detector detects a bus voltage to generate a voltage detection signal. The power module generates a first-phase current, a second-phase current and a third-phase current according to the bus voltage and a pulse-width modulation signal. The first-phase current, the second-phase current and the third-phase current are configured to drive the motor. The current detector detects at least two of the first-phase current, the second-phase current and the third-phase current to generate a current detection signal. The controller determines whether the motor is operating in a steady state according to the current detection signal. When the motor is operating in the steady state, the controller determines whether the rotation speed of the motor is zero. When the rotation speed is zero, the motor is in a stalled state and the controller calculates a DC offset error of the motor according to the voltage detection signal and the current detection signal.

According to an embodiment of the invention, the controller generates a first axis current and a second axis current according to the current detection signal, and generates a first axis voltage and a second axis voltage according to the voltage detection signal, the first axis current, and the second axis current.

According to an embodiment of the invention, the electric machine control system further comprises a power rectifier and a pulse-width modulation controller. The power rectifier converts a supply voltage into the bus voltage. The supply voltage is a three-phase AC voltage, a single-phase AC voltage or a DC voltage. The pulse-width modulation controller generates the pulse-width modulation signal according to the first axis voltage and the second axis voltage.

According to an embodiment of the invention, the controller sets the second axis voltage to zero and performs current control twice to generate a first first-axis voltage and a second first-axis voltage, and to send the first first-axis voltage and the second first-axis voltage to the pulse-width modulation controller, so that the motor generates a first first-axis measured current in response to the first first-axis voltage and generates a second first-axis measured current in response to the second first-axis voltage, wherein the controller calculates a stator resistance according to a voltage difference between the first first-axis voltage and the second first-axis voltage and a current difference between the first first-axis measured current and the second first-axis measured current, wherein the controller further calculates a DC offset error of the first axis current using the stator resistance, the first first-axis voltage, the second first-axis voltage, the first first-axis measured current and the second first-axis measured current.

According to an embodiment of the invention, the controller sets the first axis voltage to zero and performs current control twice to generate a first second-axis voltage and a second second-axis voltage, and to send the first second-axis voltage and the second second-axis voltage to the pulse-width modulation controller, so that the motor generates a first second-axis measured current in response to the first second-axis voltage and generates a second second-axis measured current in response to the second second-axis voltage, wherein the controller further calculates a DC offset error of the second axis current using the stator resistance, the first second-axis voltage, the second second-axis voltage, the first second-axis measured current and the second second-axis measured current.

According to an embodiment of the invention, the DC offset error of the first axis current and the DC offset error of the second axis current are configured to calculate the DC offset error of the motor.

According to an embodiment of the invention, the motor is Y-connected type, and when the motor is operating in the steady state, there is no variation in a time interval of a first axis current or of a second axis current.

In an embodiment, a control method adapted to a motor is provided. The control method comprises steps of: generating a first-phase current, a second-phase current and a third-phase current according to a bus voltage and a pulse-width modulation signal to drive the motor; detecting the bus voltage to generate a voltage detection signal; detecting at least two of the first-phase current, the second-phase current and the third-phase current to generate a current detection signal; determining whether the motor is operating in a steady state according to the current detection signal; when the motor is operating in the steady state, determining whether a rotation speed of the motor is zero; and when the rotation speed is zero, the motor is in a stalled state, and a calculation method is performed using the voltage detection signal and the current detection signal.

According to an embodiment of the invention, the control method further comprises steps of: generating a first axis current and a second axis current according to the current detection signal; generating a first axis voltage and a second axis voltage according to the voltage detection signal, the first axis current and the second axis current; and generating the pulse-width modulation signal according to the first axis voltage and the second axis voltage.

According to an embodiment of the invention, the control method further comprises a step of: converting a supply voltage into the bus voltage, wherein the supply voltage is a three-phase AC voltage, a single-phase AC voltage or a DC voltage.

According to an embodiment of the invention, the calculation method comprises a step of calculating a DC offset error of the first axis current, which comprises the following steps of: setting the second axis voltage to zero; performing a current control to generate a first first-axis voltage so that the motor generates a first first-axis measured current in response to the first first-axis voltage; performing a current control to generate a second first-axis voltage so that the motor generates a second first-axis measured current in response to the second first-axis voltage; estimating a stator resistance according to a voltage difference between the first first-axis voltage and the second first-axis voltage and a current difference between the first first-axis measured current and the second first-axis measured current, and calculating the DC offset error of the first axis current using the stator resistance, the first first-axis voltage, the second first-axis voltage, the first first-axis measured current and the second first-axis measured current.

According to an embodiment of the invention, the calculation method further comprises a step of calculating a DC offset error of the second axis current, which comprises the following steps of: setting the first axis voltage to zero; performing a current control to generate a first second-axis voltage so that the motor generates a first second-axis measured current in response to the first second-axis voltage; performing a current control to generate a second second-axis voltage so that the motor generates a second second-axis measured current in response to the second second-axis voltage; and calculating the DC offset error of the second axis current using the stator resistance, the first second-axis voltage, the second second-axis voltage, the first second-axis measured current and the second second-axis measured current.

According to an embodiment of the invention, the calculation method further comprises a step of: calculating a DC offset error of the motor by using the DC offset error of the first axis current and the DC offset error of the second axis current.

According to an embodiment of the invention, the step of determining whether the motor is operating in the steady state according to the current detection signal comprises steps of: determining whether a variation in a time interval of a first axis current and a variation in a time interval of a second axis current are zero; and when the variation in the time interval of the first axis current and the variation in the time interval of the second axis current are zero, determining that the motor is operating in the steady state.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
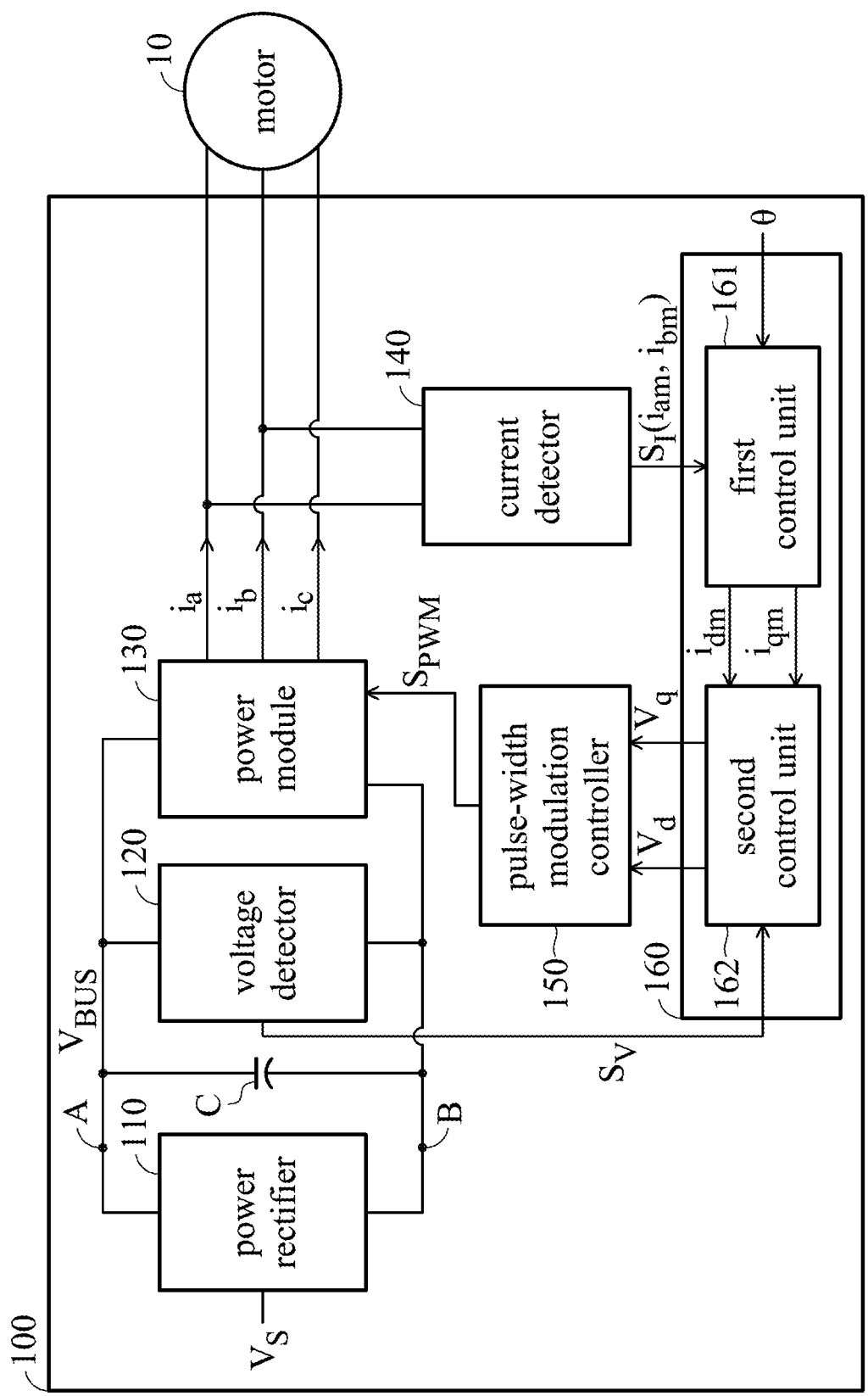
FIG. 1 is a block diagram of an electric machine system in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of an electric machine system in accordance with an embodiment of the invention. As shown in FIG. 1, the electric machine control system 100, which is configured to drive a motor 10, includes a power rectifier 110, a capacitor C, a voltage detector 120, a power module 130, a current detector 140, a pulse-width modulation controller 150 and a controller 160.

The power rectifier 110 is configured to convert a supply voltage $V_S$ into a bus voltage $V_{BUS}$ and to apply the bus voltage $V_{BUS}$ among a first node A and a second node B. The capacitor C which is coupled between the first node A and the second node B is configured to stabilize the bus voltage $V_{BUS}$. According to an embodiment of the invention, the supply voltage $V_S$ is a three-phase AC voltage. According to another embodiment of the invention, the supply voltage $V_S$ is a single-phase AC voltage. According to yet another embodiment of the invention, the supply voltage $V_S$ is a DC voltage.

The voltage detector 120, which is coupled between the first node A and the second node B, is configured to detect the bus voltage $V_{BUS}$ to generate a voltage detection signal $S_V$. According to an embodiment of the invention, the controller 160 includes a lookup table, which is configured to map the voltage detection signal $S_V$ to the voltage value of the bus voltage $V_{BUS}$. The power module 130 generates a first-phase current $i_a$, a second-phase current $i_b$ and a third-phase current $i_c$ according to the bus voltage $V_{BUS}$ and a pulse-width modulation signal $S_{PWM}$ respectively, in which the first first-phase current $i_a$, the second-phase current $i_b$ and the third-phase current $i_c$ are configured to drive the motor 10.

The current detector 140 is configured to detect at least two of the first-phase current $i_a$, the second-phase current $i_b$ and the third-phase current $i_c$ to generate a current detection signal $S_I$. According to an embodiment of the invention, when the motor 10 is Y-connected type electric machine for example, the current detector 140 may only detect two of the first-phase current $i_a$, the second-phase current $i_b$ and the third-phase current $i_c$ for cost reduction.

According to an embodiment of the invention, the current detector 140 may detect the first-phase current $i_c$ and the second-phase current $i_b$ to generate the current detention signal $S_I$. According to another embodiment of the invention, the current detector 140 may detect the second-phase current $i_b$ and the third-phase current $i_c$ to generate the current detention signal $S_I$. According to yet another embodiment of the invention, the current detector 140 may detect the first-phase current $i_c$ and the third-phase current $i_c$ to generate the current detention signal $S_I$. According to other embodiment of the invention, the current detector 140 may simultaneously detect the first-phase current $i_a$, the second-phase current $i_b$ and the third-phase current $i_c$ to generate the current detection signal $S_I$. For simplicity of explanation, it will be illustrated in the following paragraphs that the current detector 140 detects the first-phase current $i_c$ and the second-phase current $i_b$ and that the current detection signal $S_I$ includes a first (phase) measured current $i_{am}$ and a second (phase) measured current $i_{bm}$ for example.

According to an embodiment of the invention, since the current detector 140 may have a measurement error, the first-phase current $i_a$, the second-phase current $i_b$ and the third-phase current $i_c$ in the following paragraphs are viewed as the real current of the current detector 140, and the first measured current $i_{am}$, the second measured current $i_{bm}$ and the third (phase) measured current $i_{cm}$ are viewed as the detected current by the current detector 140. As illustrated in FIG. 1, the current detection signal $S_I$ includes the first measured current $i_{am}$ and the second measured current $i_{bm}$.

The pulse-width modulation controller 150 generates the pulse-width modulation signal $S_{PWM}$ according to a direct axis voltage $V_d$ and a quadrature axis voltage $V_q$ generated by the controller 160. As shown in FIG. 1, the controller 160 further includes a first control unit 161 and a second control unit 162.

The first control unit 161 converts a three-phase current signal into a direct axis current signal and a quadrature axis current signal. In detail, the first control unit 161 converts the first measured current $i_{am}$ and the second measured current $i_{bm}$ detected by the current detector 140 into the direct axis current $i_{dm}$ and the quadrature axis current $i_{qm}$ according to the current detection signal $S_I$ and the angle $\theta$ rotated by the motor 10. The detailed converting process will be described in the following paragraphs.

The second control unit 162 converts the direct axis current signal and the quadrature axis current signal generated by the first control unit 161 into a direct axis voltage signal and a quadrature axis voltage signal. More specifically, the second control unit 162 generates the direct axis voltage $V_d$ and the quadrature axis voltage $V_q$ according to the direct axis measured current $i_{dm}$, the quadrature axis measured current $i_{qm}$ and the voltage detection signal $S_V$, and transmits the direct axis voltage $V_d$ and the quadrature axis voltage $V_q$ to the pulse-width modulation controller 150 for controlling the first-phase current $i_a$, the second-phase current $i_b$ and the third-phase current $i_c$ generated by the power module 130.

When the current is stabilized, the sum of values of the first-phase current $i_a$, the second-phase current $i_b$ and the third-phase current $i_c$ is zero, and the first measured current $i_{am}$, the second measured current $i_{bm}$ and the third measured current $i_{cm}$ are expressed as Eq. 1. As shown in Eq. 1, $I_S$ is the DC current, $I_{a\_err}$ and $I_{b\_err}$ are DC offset errors, and $\theta$ is the rotated angle of the motor 10.

$$\begin{bmatrix} i_{am} \\ i_{bm} \\ i_{cm} \end{bmatrix} = \begin{bmatrix} I_S \cos\theta \\ I_S \cos(\theta - 120°) \\ I_S \cos(\theta + 120°) \end{bmatrix} + \begin{bmatrix} I_{a\_err} \\ I_{b\_err} \\ -(I_{a\_err} + I_{b\_err}) \end{bmatrix} \quad \text{(Eq. 1)}$$

As shown in FIG. 1, the first control unit 161 converts the first measured current $i_{am}$, the second measured current $i_{bm}$ and the third measured current $i_{cm}$ into the direct axis measured current $i_{dm}$ and the quadrature axis measured current $i_{qm}$ by using Eq. 2-1 and Eq. 2-2. Then, Eq. 1 is introduced into Eq. 2-1 and Eq. 2-2 to obtain Eq. 2-3 and Eq. 2-4, respectively.

$$i_{dm} = \frac{2}{3}[i_{am}\sin\theta + i_{bm}\sin(\theta - 120°) + i_{cm}\sin(\theta + 120°)] \quad \text{(Eq. 2-1)}$$

$$i_{qm} = \frac{2}{3}[i_{am}\cos\theta + i_{bm}\cos(\theta - 120°) + i_{cm}\cos(\theta + 120°)] \quad \text{(Eq. 2-2)}$$

$$i_{dm} = 0 + \left(\sin\theta - \frac{1}{\sqrt{3}}\cos\theta\right)I_{a\_err} + \left(-\frac{2}{\sqrt{3}}\cos\theta\right)I_{b\_err} \quad \text{(Eq. 2-3)}$$

$$i_{qm} = I_S + \left(\cos\theta + \frac{1}{\sqrt{3}}\sin\theta\right)I_{a\_err} + \left(\frac{2}{\sqrt{3}}\sin\theta\right)I_{b\_err} \quad \text{(Eq. 2-4)}$$

According to an embodiment of the invention, when the controller 160 determines that the motor 10 is operating in a steady state and the rotation speed of the motor 10 is zero, the controller 160 calculates, using the voltage detection signal $S_V$ and the current detection signal $S_I$, an DC offset error of the motor 10 is being driven, in which the DC offset error of the motor 10 includes fore-mentioned DC offset errors $I_{a\_err}$ and $I_{b\_err}$. According to an embodiment of the invention, when the variations in a specific time interval of the first measured current $i_{am}$ and the second measured current $i_{bm}$ detected by the current detector 140 are both zero, the controller 160 determines that the motor 10 is operating in a steady state. When the variation in the time interval is zero, this state indicates that the current values of the first measured current $i_{am}$ and the second measured current $i_{bm}$ in the specific time interval are constant, and such that the current values keep constant with time passing by, so that the motor 10 is surely operating in the steady state.

According to another embodiment of the invention, when the controller 160 determines that the variations in the time interval of the direct axis measured current $i_{dm}$ and the quadrature axis measured current $i_{qm}$ are both zero, the controller 160 determines that the motor 10 is operating in the steady state. According to an embodiment of the invention, when the motor 10 is a driving motor of an elevator, the mechanical brake of the elevator can be utilized to operate the motor in a stalled state, and the rotation speed of the motor is zero during the stalled state.

The direct axis voltage $V_d$ and the quadrature axis voltage $V_q$ are expressed as Eq. 3, in which rs is the stator resistance of the motor 10.

$$\begin{bmatrix} V_d \\ V_q \end{bmatrix} = \begin{bmatrix} rs \times i_d + L_d \frac{di_d}{dt} - \omega L_q i_q \\ rs \times i_q + L_q \frac{di_q}{dt} + \omega(L_d i_d + \lambda_m) \end{bmatrix} \quad \text{(Eq. 3)}$$

When the rotation speed of the motor 10 is zero and the motor 10 is operating in the steady state, since the derivative terms in Eq. 3 and the angular speed are both zero, so that Eq. 3 can be simplified as Eq. 4:

$$\begin{bmatrix} V_d \\ V_q \end{bmatrix} = \begin{bmatrix} rs \times i_d \\ rs \times i_q \end{bmatrix} \quad \text{(Eq. 4)}$$

The direct axis measured current $i_{dm}$ and the quadrature axis measured current $i_{qm}$ are expressed as Eq. 5-1, and the currents actually flowing through the motor 10, the direct axis current $i_d$ and the quadrature axis current $i_q$, are expressed as Eq. 5-2. The direct axis current $i_d$ and the quadrature axis current $i_q$ are transformed from the real currents flowing through the motor 10. $\Delta i_{dm}$ is the direct axis offset error, and $\Delta i_{dm}$ is the quadrature axis DC offset error. When the direct axis offset error $\Delta i_{dm}$ and the quadrature axis DC offset error $\Delta i_{qm}$ in Eq. 5 are shifted to the other side of expression of the equal sign, Eq. 5-2 is thus obtained.

$$\begin{bmatrix} i_{dm} \\ i_{qm} \end{bmatrix} = \begin{bmatrix} i_d + \Delta i_{dm} \\ i_q + \Delta i_{qm} \end{bmatrix} \quad \text{(Eq. 5-1)}$$

$$\begin{bmatrix} i_d \\ i_q \end{bmatrix} = \begin{bmatrix} i_{dm} - \Delta i_{dm} \\ i_{qm} - \Delta i_{qm} \end{bmatrix} \quad \text{(Eq. 5-2)}$$

After Eq. 5-2 is introduced into Eq. 4, then the Eq. 6 is thus obtained:

$$\begin{bmatrix} V_d \\ V_q \end{bmatrix} = rs \begin{bmatrix} i_d \\ i_q \end{bmatrix} = rs \begin{bmatrix} i_{dm} - \Delta i_{dm} \\ i_{qm} - \Delta i_{qm} \end{bmatrix} \quad \text{(Eq. 6)}$$

According to an embodiment of the invention, when the controller 160 calculates the DC offset error of the motor 10, the controller 160 firstly sets one of the direct axis voltage $V_d$ and the quadrature axis voltage $V_q$ to zero so as to reduce variables and simplify calculation process, and then sets the other one of the direct axis voltage $V_d$ and the quadrature axis voltage $V_q$ to zero again and repeat similar calculations. For simplicity of explanation, it will be described in the following paragraphs that the controller 160 firstly sets the quadrature axis voltage $V_q$ to zero. According to an embodiment of the invention, the direct axis voltage $V_d$ would be further set to zero thereafter, and the similar operations described above would be repeated.

According to an embodiment of the invention, when the controller 160 sets the quadrature axis voltage $V_q$ to zero, the controller 160 generates, according to the voltage detection signal $S_V$, a first direct-axis voltage $V_{d1}$ and a second direct-axis voltage $V_{d2}$. Therefore, the pulse-width modulation controller 150 generates, in response to the first direct-axis voltage $V_{d1}$ and the second direct-axis voltage $V_{d2}$, the corresponding pulse-width modulation signal $S_{PWM}$, and the motor 10 generates a first direct-axis measured current $i_{dm1}$ in response to the first direct-axis voltage $V_{d1}$, and generates a second direct-axis measured current $i_{dm2}$ in response to the second direct-axis voltage $V_{d2}$. According to an embodiment of the invention, the voltage value of the first direct-axis voltage $V_{d1}$ is different from that of the second direct-axis voltage $V_{d2}$.

The controller 160 then introduces the first direct-axis voltage $V_{d1}$, the second direct-axis voltage $V_{d2}$, the first direct-axis measured current $i_{dm1}$ and the second direct-axis measured current $i_{dm2}$ into Eq. 6, sets the quadrature axis voltage $V_q$ to zero, and performs current control twice to respectively obtain the measurement results as illustrated in the following equations Eq. 7-1 and Eq. 7-2. $V_{d1}$ and $V_{d2}$ are the first direct-axis voltage and the second direct-axis voltage during two iteration operations of current control, and $i_{dm1}$ and $i_{dm2}$ are the first direct-axis measured current and the second direct-axis measured current respectively during two iteration operations of current control.

$$V_{d1} = rs \times i_{d1} = rs \times (i_{dm1} - \Delta i_{dm}) \quad \text{(Eq. 7-1)}$$

$$V_{d2} = rs \times i_{d2} = rs \times (i_{dm2} - \Delta i_{dm}) \quad \text{(Eq. 7-2)}$$

For calculating the stator resistance rs, the controller 160 subtracts Eq. 7-2 from Eq. 7-1 to obtain the following equation Eq. 8-1, in which the value of $V_{d1} - V_{d2}$ is a voltage difference, and the value of $i_{d1} - i_{d2}$ (i.e., $i_{dm1} - i_{dm2}$) is a current difference. Then, Eq. 8-1 is arranged to obtain the following equation Eq. 8-2. As shown in Eq. 8-2, rs' is an estimated value of the stator resistance.

$$V_{d1} - V_{d2} = (i_{dm1} - i_{dm2}) \times rs \quad \text{(Eq. 8-1)}$$

$$rs' = \frac{V_{d1} - V_{d2}}{i_{dm1} - i_{dm2}} \quad \text{(Eq. 8-2)}$$

Then, the controller 160 further introduces rs' in Eq. 8-2 into Eq. 7-1 and Eq. 7-2 to obtain Eq. 9.

$$\begin{bmatrix} V_{d1} \\ V_{d2} \end{bmatrix} \approx rs' \begin{bmatrix} i_{dm1} - \Delta i_{dm} \\ i_{dm2} - \Delta i_{dm} \end{bmatrix} \quad \text{(Eq. 9)}$$

According to Eq. 9, the direct axis offset error $\Delta i_{dm}$ can be expressed by Eq. 10-1 and Eq. 10-2.

$$\Delta i_{dm} \approx i_{dm1} - \frac{V_{d1}}{rs'} \quad \text{(Eq. 10-1)}$$

$$\Delta i_{dm} \approx i_{dm2} - \frac{V_{d2}}{rs'} \quad \text{(Eq. 10-2)}$$

According to an embodiment of the invention, the direct axis offset error $\Delta i_{dm}$ may be either Eq. 10-1 or Eq. 10-2. According to another embodiment of the invention, the direct axis offset error $\Delta i_{dm}$ may be the average value of Eq. 10-1 and Eq. 10-2.

Similarly, as described above, the controller 160 further sets the direct axis voltage $V_d$ to zero at this time, and generates a first quadrature-axis voltage $V_{q1}$ and a second quadrature-axis voltage $V_{q2}$ according to the voltage detection signal $S_V$ similarly. Meanwhile, the current detector 140 detects a first quadrature-axis measured current $i_{qm1}$ in response to the first quadrature-axis voltage $V_{q1}$, and detects a second quadrature-axis measured current $i_{qm2}$ in response to the second quadrature-axis voltage $V_{q2}$. According to an embodiment of the invention, the voltage value of the first quadrature-axis voltage $V_{q1}$ is different from that of the second quadrature-axis voltage $V_{q2}$.

Then, the controller 160 calculates the quadrature axis offset error $\Delta i_{qm}$ as expressed by the following equations Eq. 11-1 and Eq. 11-2 by using Eq. 7-1 to Eq. 10-2.

$$\Delta i_{qm} \approx i_{qm1} - \frac{V_{q1}}{rs'} \quad \text{(Eq. 11-1)}$$

$$\Delta i_{qm} \approx i_{qm2} - \frac{V_{q2}}{rs'} \quad \text{(Eq. 11-2)}$$

According to an embodiment of the invention, the quadrature axis offset error $\Delta i_{qm}$ may be either Eq. 11-1 or Eq. 11-2.

According to another embodiment of the invention, the quadrature axis offset error $\Delta i_{qm}$ may be the average value of Eq. 11-1 and Eq. 11-2.

In Eq. 2-3 and Eq. 2-4, since $I_{a\_err}$ and $I_{b\_err}$ are projections on A phase and B phase of the DC offset error of the motor 10 respectively, the relationship of the direct axis offset error $\Delta i_{da}$, and the quadrature axis offset error $\Delta i_{qm}$ to $I_{a\_err}$ and $I_{b\_err}$ is expressed as the following equation Eq. 12.

$$\begin{bmatrix} \Delta i_{dm} \\ \Delta i_{qm} \end{bmatrix} = \begin{bmatrix} \sin\theta - \frac{1}{\sqrt{3}}\cos\theta & -\frac{2}{\sqrt{3}}\cos\theta \\ \cos\theta + \frac{1}{\sqrt{3}}\sin\theta & \frac{2}{\sqrt{3}}\sin\theta \end{bmatrix} \begin{bmatrix} I_{a\_err} \\ I_{b\_err} \end{bmatrix} \quad \text{(Eq. 12)}$$

Since the direct axis offset error $\Delta i_{dm}$ is obtained from Eq. 10-1 and Eq. 10-2 and the quadrature axis offset error $\Delta i_{qm}$ is obtained from Eq. 11-1 and Eq. 11-2, the direct axis offset error $\Delta i_{da}$, and the quadrature axis offset error $\Delta i_{qm}$ are introduced into the following equation Eq. 13 to calculate the DC offset $I_{a\_err}$ and $I_{b\_err}$ of the motor 10.

$$\begin{bmatrix} I_{a\_err} \\ I_{b\_err} \end{bmatrix} = \begin{bmatrix} \sin\theta - \frac{1}{\sqrt{3}}\cos\theta & -\frac{2}{\sqrt{3}}\cos\theta \\ \cos\theta + \frac{1}{\sqrt{3}}\sin\theta & \frac{2}{\sqrt{3}}\sin\theta \end{bmatrix}^{-1} \begin{bmatrix} \Delta i_{dm} \\ \Delta i_{qm} \end{bmatrix} \quad \text{(Eq. 13)}$$

Figure 2A:
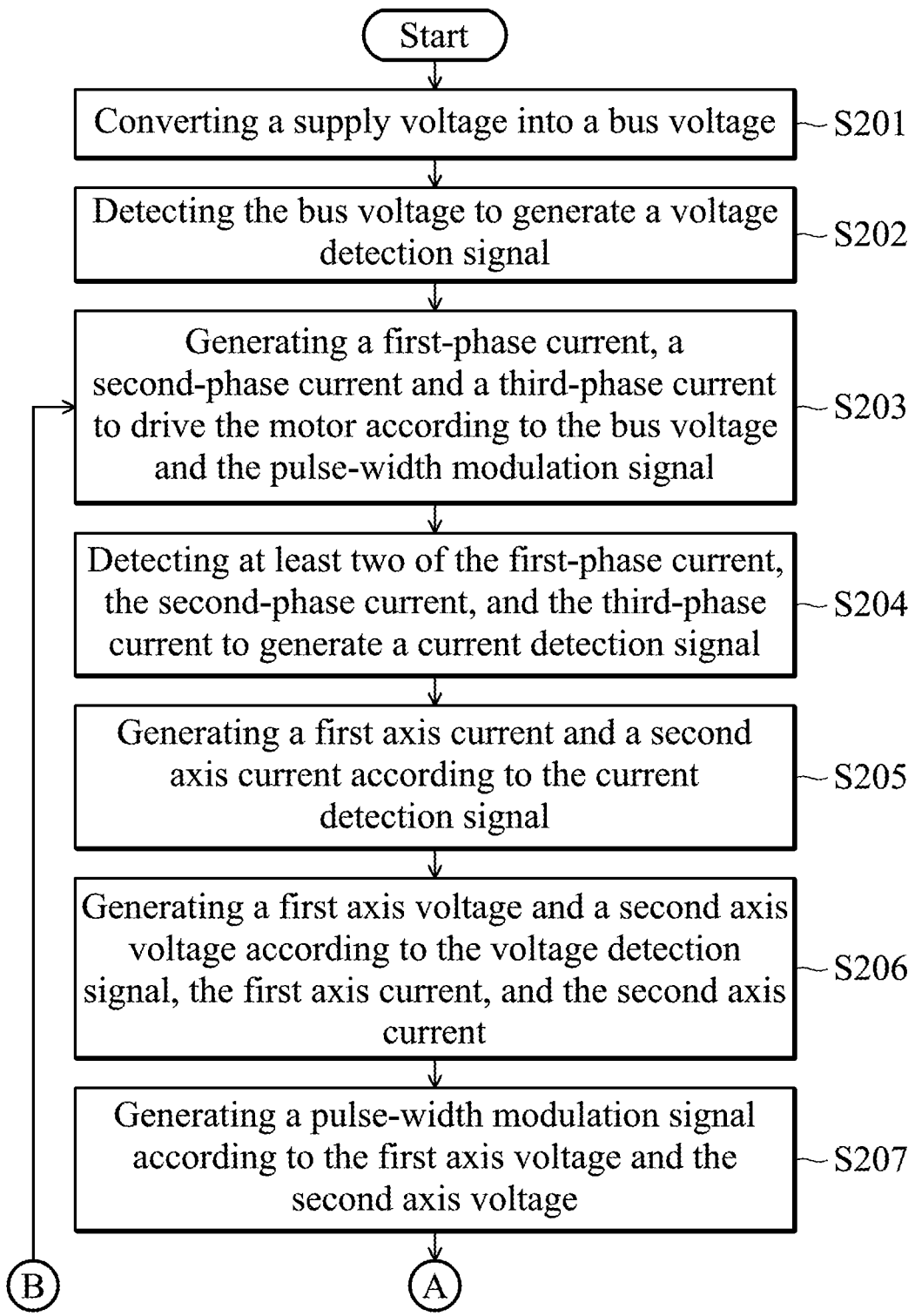
FIGS. 2A-2B are a flow chart of a control method in accordance with an embodiment of the invention.
Figure 2B:
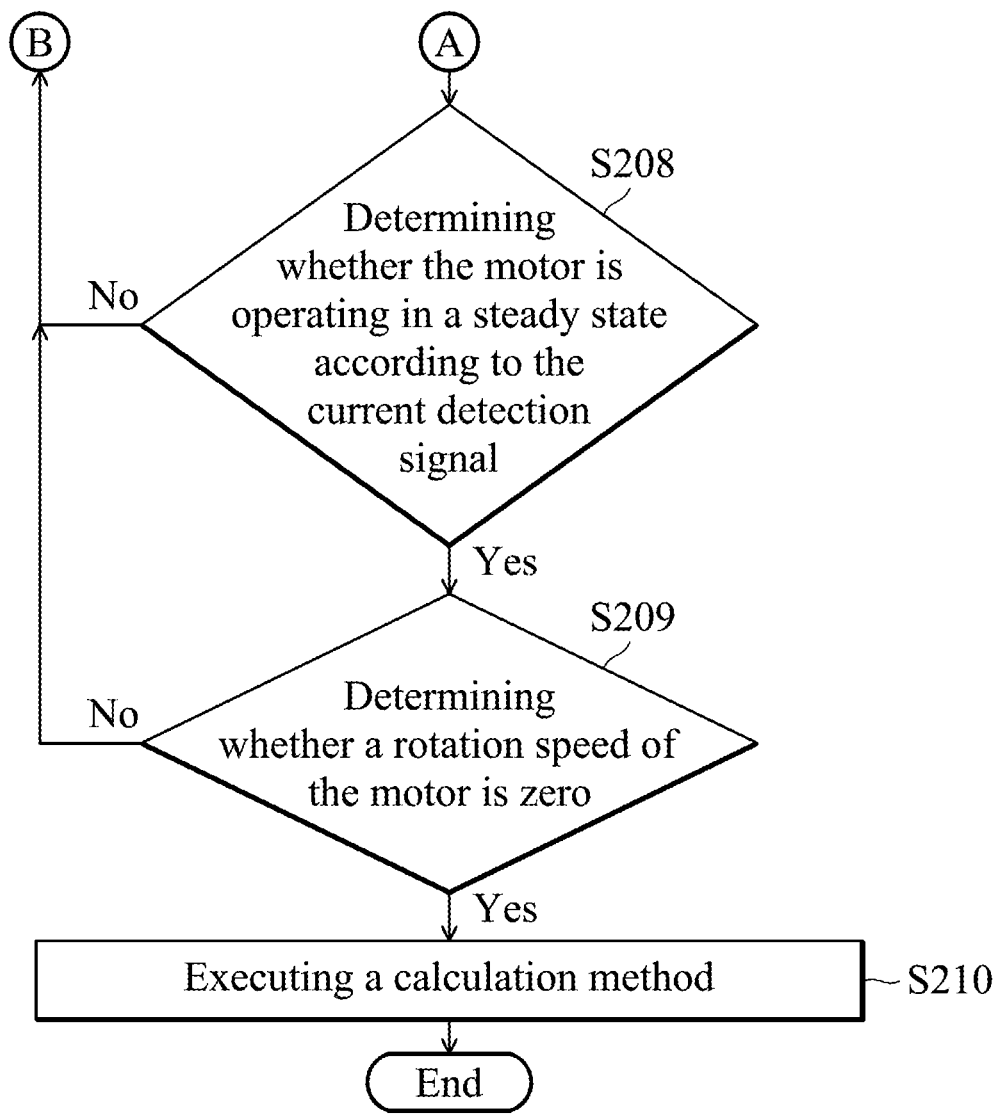

FIGS. 2A-2B are a flow chart of a control method in accordance with an embodiment of the invention. In the following description of the flow chart in FIGS. 2A-2B, FIG. 1 will be accompanied with a detailed explanation.

Firstly, the power rectifier 110 in FIG. 1 converts a supply voltage $V_S$ into a bus voltage $V_{BUS}$ (Step S201), in which the bus voltage $V_{BUS}$ is applied between the first node A and the second node B. The capacitor C is coupled between the first node A and the second node B, which is configured to stabilize the bus voltage $V_{BUS}$. According to an embodiment of the invention, the supply voltage $V_S$ is a three-phase AC voltage. According to another embodiment of the invention, the supply voltage $V_S$ is a single-phase AC voltage. According to yet another embodiment of the invention, the supply voltage $V_S$ is a DC voltage.

The voltage detector 120 detects the bus voltage $V_{BUS}$ to generate a voltage detection signal $S_V$ (Step S202). According to an embodiment of the invention, the controller 160 has a lookup table, which is configured to map the voltage detection signal $S_V$ to the bus voltage $V_{BUS}$. The power module 130 generates, according to the bus voltage $V_{BUS}$ and the pulse-width modulation signal $S_{PWM}$, a first-phase current $i_a$, a second-phase current $i_b$ and a third-phase current $i_c$ to drive the motor 10 (Step S203).

The current detector 140 detects at least two of the first-phase current $i_a$, the second-phase current $i_b$ and the third-phase current $i_c$ to generate a current detection signal $S_I$ (Step S204). According to some embodiments of the invention, when the motor 10 is Y-connected type electric machine for example, the current detector 140 may detect the first-phase current $i_c$ and the second-phase current $i_b$, the second-phase current $i_b$ and the third-phase current $i_c$, or the first-phase current $i_c$ and the third-phase current $i_c$ to generate the current detection signal $S_I$. According to other embodiments of the invention, the current detector 140 may simultaneously detect the first-phase current $i_a$, the second-phase current $i_b$ and the third-phase current $i_c$ to generate the current detection signal $S_I$.

Then, the controller 160 generates, according to the current detection signal $S_I$, a first axis current and a second axis current (Step S205). According to an embodiment of the invention, the first axis current may be the direct axis measured current $i_{dm}$ in FIG. 1, and the second axis current may be the quadrature axis measured current $i_{qm}$ in FIG. 1. According to another embodiment of the invention, the first axis current may be the quadrature axis measured current $i_{qm}$ in FIG. 1, and the second axis current may be the direct axis measured current $i_{dm}$ in FIG. 1.

In addition, the controller 160 generates, according to the voltage detection signal $S_V$, the first axis current and the second axis current, a first axis voltage and a second axis voltage (Step S206). According to an embodiment of the invention, when the first axis current is the direct axis measured current $i_{dm}$ and the second axis current is the quadrature axis measured current $i_{qm}$, the first axis voltage is the direct axis voltage $V_d$ and the second axis voltage is the quadrature axis voltage $V_q$. According to another embodiment of the invention, when the first axis current is the quadrature axis measured current $i_{qm}$ and the second axis current is the direct axis measured current $i_{dm}$, the first axis voltage is the quadrature axis voltage $V_q$ and the second axis voltage is the direct axis voltage $V_d$.

Then, the controller 160 further generates, according to the first axis voltage and the second axis voltage, a pulse-width modulation signal $S_{PWM}$ (Step S207) for controlling parameters of the motor 10.

The controller 160 determines, according to the current detection signal $S_I$, whether the motor 10 is operating in a steady state (Step S208). According to an embodiment of the invention, when the controller 160 in FIG. 1 determines that the variations in the time interval of the first measured current $i_{am}$ and the second measured current $i_{bm}$ are both zero, this indicates that the motor 10 is operating in a steady state. According to another embodiment of the invention, when the controller 160 in FIG. 1 determines that the variations in the time interval of the direct axis measured current $i_{dm}$ and the quadrature axis measured current $i_{qm}$ are both zero, this indicates that the motor 10 is operating in the steady state. According to some embodiments of the invention, when the controller 160 determines that the current values of the direct axis measured current $i_{dm}$ and the quadrature axis measured current $i_{qm}$ are constant in a specific measurement time interval without varying with time passing by, it is assured that the motor 10 is operating in the steady state.

When the controller 160 determines that the motor 10 is operating in the steady state, the controller 160 further determines whether a rotation speed of the motor 10 is zero (Step S209). According to an embodiment of the invention, when the motor 10 is the driving motor of an elevator, the mechanical brake of the elevator can be utilized to block the motor 10 so that the rotation speed of the motor 10 is zero. According to some embodiments of the invention, when the rotation speed the motor 10 is zero, this indicates that the rotated angle $\theta$ of the motor 10 is fixed.

When the motor 10 is operating in the steady state and the rotation speed of the motor 10 is zero, the controller 160 executes or performs a calculation method according to the voltage detection signal $S_V$ and the current detection signal $S_I$ (Step S210), such as calculating the DC offset error of the motor 10. When either Step S208 or Step S209 is determined to be NO, the method returns back to Step S203.

Figure 3:
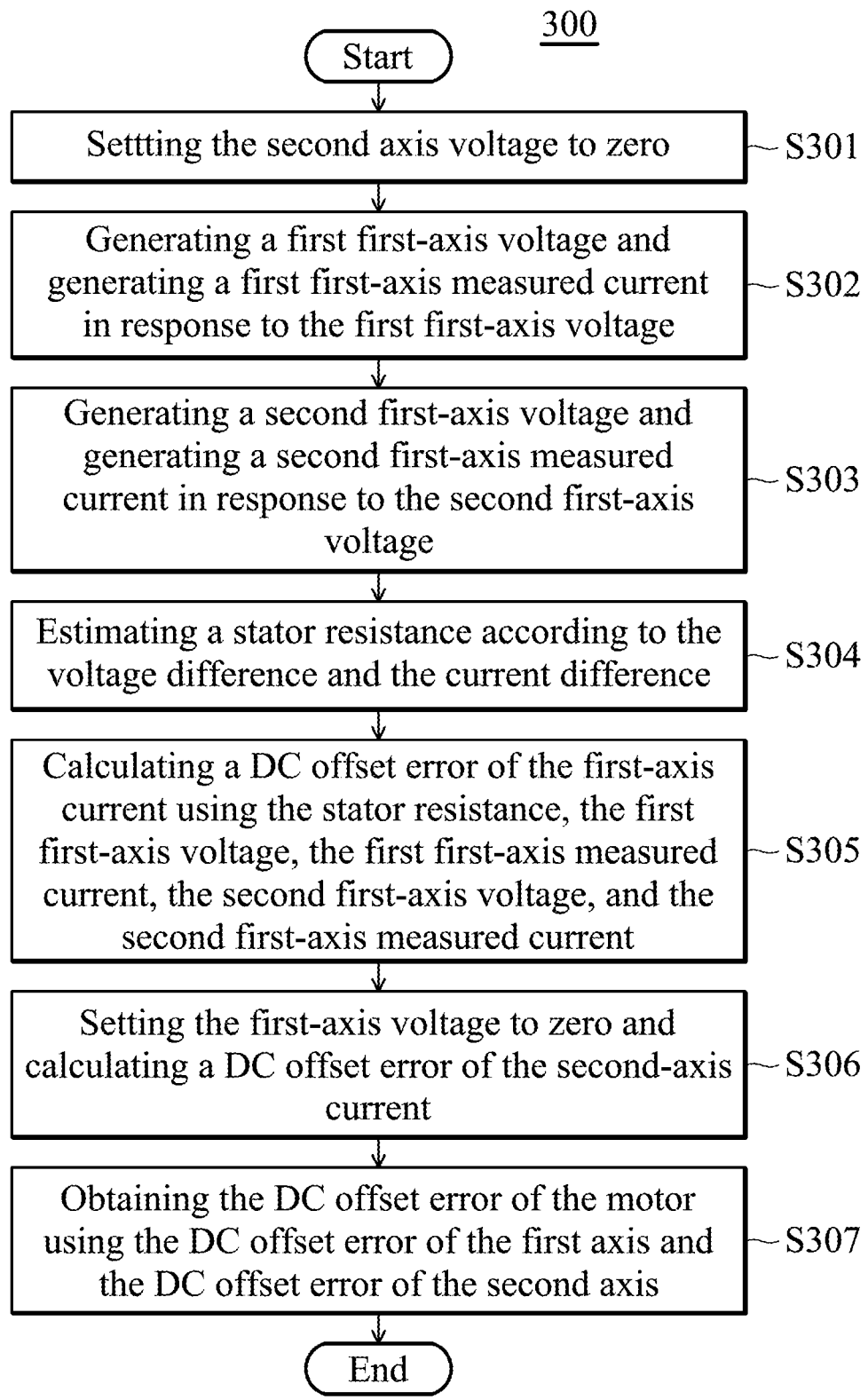
FIG. 3 is a flow chart of a calculation method in accordance with an embodiment of the invention.

FIG. 3 is a flow chart of a calculation method in accordance with an embodiment of the invention. As shown in FIG. 3, the calculation method 300 is configured to calculate the DC offset error while the motor 10 is being driven. In the following description of the calculation method 300, the block diagram in FIG. 1 and flow chart in FIG. 2 will be accompanied with a detailed explanation.

Firstly, the second axis voltage is set to zero (Step S301). According to an embodiment of the invention, the first axis voltage is the direct axis voltage $V_d$ and the second axis voltage is the quadrature axis voltage $V_q$. According to another embodiment of the invention, the first axis voltage is the quadrature axis voltage $V_q$ and the second axis voltage is the direct axis voltage $V_d$.

The first iteration operation of a current control is then performed. The controller 160 generates a first first-axis voltage and generates a first first-axis measured current in response to the first first-axis voltage (Step S302). According to an embodiment of the invention, when the first first-axis voltage is the first direct-axis voltage $V_{d1}$, the first first-axis measure current is the first direct-axis measured current $i_{dm1}$. According to another embodiment of the invention, when the first first-axis voltage is a first quadrature-axis voltage $V_{q1}$, the first first-axis measured current is the first quadrature-axis measured current $i_{qm1}$.

Then, the controller 160 further performs the second iteration operation of current control to generate a second first-axis voltage and to generate a second first-axis measured current in response to the second first-axis voltage (Step S303). According to an embodiment of the invention, when the second first-axis voltage is the second direct-axis voltage $V_{d2}$, the second first-axis measured current is the second direct-axis measured current $i_{dm2}$. According to another embodiment of the invention, when the second first-axis voltage is the second quadrature-axis voltage $V_{q2}$, the second first-axis measured current is the second quadrature-axis current $i_{qm2}$. It should be noted that the voltage values generated during the two iteration operations of current controls are different. Namely, the first first-axis voltage is different than the second first-axis voltage.

The controller 160 estimates a stator resistance according to the voltage difference and the current difference (Step S304). According to an embodiment of the invention, the voltage difference is the difference between the first first-axis voltage and the second first-axis voltage, and the current difference is the difference between the first first-axis current and the second first-axis current. According to an embodiment of the invention, the controller 160 estimates the stator resistance rs' by using Eq. 8-2.

The controller 160 calculates a DC offset error of the first axis current using the stator resistance, the first first-axis voltage, the first first-axis measured current, the second first-axis voltage and the second first-axis measured current (Step S305). According to an embodiment of the invention, when the first axis voltage is the direct axis voltage $V_d$, the controller 160 calculates the direct axis offset error $\Delta i_{dm}$ by using Eq. 10-1 and Eq. 10-2. According to an embodiment of the invention, the direct axis offset error $\Delta i_{dm}$ may be either the one expressed in Eq. 10-1 or the one expressed in Eq. 10-2. According to another embodiment of the invention, the direct axis offset error $\Delta i_{dm}$ may be the average value of Eq. 10-1 and Eq. 10-2.

A current control method similar to Step S301 to Step S305 is repeated. Namely, the controller 160 then sets the first axis voltage to zero in a current control method, and Eq. 11-1 and Eq. 11-2 are utilized to calculate a DC offset error of the second axis current (Step S306). According to an embodiment of the invention, when the first axis voltage is the direct axis voltage $V_d$, the second axis voltage is the quadrature axis voltage $V_q$, and the controller 160 calculates the quadrature axis offset error $\Delta i_{qm}$ by using Eq. 11-1 and Eq. 11-2. According to an embodiment of the inventions, the quadrature axis offset error $\Delta i_{qm}$ may be expressed as either Eq. 11-1 or Eq. 11-2. According to another embodiment of the inventions, the quadrature axis offset error $\Delta i_{qm}$ may be the average value of Eq. 11-1 and Eq. 11-2.

More precisely, according to other embodiments of the invention, when Step S301 to Step S306 are repeated to obtain the direct axis offset error $\Delta i_{dm}$ and the quadrature axis offset error $\Delta i_{qm}$ respectively and successively, the obtained direct axis offset error $\Delta i_{dm}$ and the quadrature axis offset error $\Delta i_{qm}$ can be further introduced into Eq. 13 to obtain the DC offset error $I_{a\_err}$ and $I_{b\_err}$ (Step S307).

A calculation method for calculating the DC offset error is provided herein. The electric machine control system is able to directly estimate the DC offset error so that the motor control can be more precise and more reliable.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electric machine control system, adapted to a motor, comprising:
    a voltage detector, detecting a bus voltage to generate a voltage detection signal;
    a power module, generating a first-phase current, a second-phase current, and a third-phase current according to the bus voltage and a pulse-width modulation signal, wherein the first-phase current, the second-phase current, and the third-phase current are configured to drive the motor;
    a current detector, detecting at least two of the first-phase current, the second-phase current, and the third-phase current to generate a current detection signal; and
    a controller, determining whether the motor is operating in a steady state according to the current detection signal, wherein when the motor is operating in the steady state, the controller determines whether a rotation speed of the motor is zero, wherein when the rotation speed is zero, the motor is in a stalled state and the controller calculates a DC offset error of the motor according to the voltage detection signal and the current detection signal.

2. The electric machine control system of claim 1, wherein the controller generates a first axis current and a second axis current according to the current detection signal, and generates a first axis voltage and a second axis voltage according to the voltage detection signal, the first axis current, and the second axis current.

3. The electric machine control system of claim 2, further comprising:
    a power rectifier, converting a supply voltage into the bus voltage, wherein the supply voltage is a three-phase AC voltage, a single-phase AC voltage or a DC voltage; and
    a pulse-width modulation controller, generating the pulse-width modulation signal according to the first axis voltage and the second axis voltage.

4. The electric machine control system of claim 3, wherein the controller sets the second axis voltage to zero and performs current control twice to generate a first first-axis voltage and a second first-axis voltage, and to send the first first-axis voltage and the second first-axis voltage to the pulse-width modulation controller, so that the motor generates a first first-axis measured current in response to the first first-axis voltage and generates a second first-axis measured current in response to the second first-axis voltage, wherein the controller calculates a stator resistance according to a voltage difference between the first first-axis voltage and the second first-axis voltage and a current difference between the first first-axis measured current and the second first-axis measured current, wherein the controller further calculates a DC offset error of the first axis current using the stator resistance, the first first-axis voltage, the second first-axis voltage, the first first-axis measured current and the second first-axis measured current.

5. The electric machine control system of claim 4, wherein the controller sets the first axis voltage to zero and performs current control twice to generate a first second-axis voltage and a second second-axis voltage, and to send the first second-axis voltage and the second second-axis voltage to the pulse-width modulation controller, so that the motor generates a first second-axis measured current in response to the first second-axis voltage and generates a second second-axis measured current in response to the second second-axis voltage, wherein the controller further calculates a DC offset error of the second axis current using the stator resistance, the first second-axis voltage, the second second-axis voltage, the first second-axis measured current and the second second-axis measured current.

6. The electric machine control system of claim 5, wherein the DC offset error of the first axis current and the DC offset error of the second axis current are configured to calculate the DC offset error of the motor.

7. The electric machine control system of claim 1, wherein the motor is Y-connected type, and when the motor is operating in the steady state, there is no variation in a time interval of a first axis current or of a second axis current.

8. A control method adapted to a motor, comprising steps of:
generating a first-phase current, a second-phase current, and a third-phase current according to a bus voltage and a pulse-width modulation signal to drive the motor;
detecting the bus voltage to generate a voltage detection signal;
detecting at least two of the first-phase current, the second-phase current, and the third-phase current to generate a current detection signal;
determining whether the motor is operating in a steady state according to the current detection signal;
when the motor is operating in the steady state, determining whether a rotation speed of the motor is zero; and
when the rotation speed is zero, the motor is in a stalled state, and a calculation method is performed using the voltage detection signal and the current detection signal.

9. The control method of claim 8, further comprising steps of:
generating a first axis current and a second axis current according to the current detection signal;
generating a first axis voltage and a second axis voltage according to the voltage detection signal, the first axis current, and the second axis current; and
generating the pulse-width modulation signal according to the first axis voltage and the second axis voltage.

10. The control method of claim 9, further comprising a step of:
converting a supply voltage into the bus voltage, wherein the supply voltage is a three-phase AC voltage, a single-phase AC voltage or a DC voltage.

11. The control method of claim 9, wherein the calculation method comprises a step of calculating a DC offset error of the first axis current, which comprises the following steps of:
setting the second axis voltage to zero;
performing a current control to generate a first first-axis voltage so that the motor generates a first first-axis measured current in response to the first first-axis voltage;
performing a current control to generate a second first-axis voltage so that the motor generates a second first-axis measured current in response to the second first-axis voltage;
estimating a stator resistance according to a voltage difference between the first first-axis voltage and the second first-axis voltage and a current difference between the first first-axis measured current and the second first-axis measured current; and
calculating the DC offset error of the first axis current using the stator resistance, the first first-axis voltage, the second first-axis voltage, the first first-axis measured current and the second first-axis measured current.

12. The control method of claim 11, wherein the calculation method further comprises a step of calculating a DC offset error of the second axis current, which comprises the following steps of:
setting the first axis voltage to zero;
performing a current control to generate a first second-axis voltage so that the motor generates a first second-axis measured current in response to the first second-axis voltage;
performing a current control to generate a second second-axis voltage so that the motor generates a second second-axis measured current in response to the second second-axis voltage; and
calculating the DC offset error of the second axis current using the stator resistance, the first second-axis voltage, the second second-axis voltage, the first second-axis measured current and the second second-axis measured current.

13. The control method of claim 12, wherein the calculation method further comprises a step of:
calculating a DC offset error of the motor by using the DC offset error of the first axis current and the DC offset error of the second axis current.

14. The control method of claim 8, wherein the step of determining whether the motor is operating in the steady state according to the current detection signal comprises steps of:
determining whether a variation in a time interval of a first axis current and a variation in a time interval of a second axis current are zero; and
when the variation in the time interval of the first axis current and the variation in the time interval of the second axis current are zero, determining that the motor is operating in the steady state.

* * * * *